(12) United States Patent
Liu et al.

(10) Patent No.: US 7,848,786 B2
(45) Date of Patent: Dec. 7, 2010

(54) PORTABLE ELECTRONIC DEVICE (75) Inventors: Chung-Yu Liu, Taichung (TW);
Wang-Hung Yeh, Taoyuan (TW);
Ping-Chu Tsai, Chiayi (TW)

(73) Assignee: Foxconn Communication Technology Corp., Taoyuan County (TW)

( * ) Notice: Subject to any disclaimer, the term of this patent is extended or adjusted under 35 U.S.C. 154(b) by 483 days.

(21) Appl. No.: 12/044,224

(22) Filed: Mar. 7, 2008

(65) Prior Publication Data

US 2009/0160777 A1 Jun. 25, 2009

(30) Foreign Application Priority Data

Dec. 19, 2007 (TW) ............................... 96221649 U (51) Int. Cl.
*H04M 1/00* (2006.01)
(52) U.S. Cl. .............. 455/575.1; 455/575.2; 455/575.3; 455/575.4
(58) Field of Classification Search .............. 455/575.1, 455/575.2, 575.3, 575.4
See application file for complete search history.

(56) References Cited

U.S. PATENT DOCUMENTS

| | | | |
|---|---|---|---|
| 7,110,797 B2 * | 9/2006 | Soejima .................... | 455/575.1 |
| 7,450,979 B2 * | 11/2008 | Seo .......................... | 455/575.4 |
| 7,539,526 B2 * | 5/2009 | Pirila et al. ............... | 455/575.3 |
| 7,587,225 B2 * | 9/2009 | Kim et al. ................. | 455/575.1 |
| 7,756,554 B2 * | 7/2010 | Jung ........................ | 455/575.3 |
| 2005/0026658 A1 * | 2/2005 | Soejima .................... | 455/575.1 |
| 2005/0107142 A1 * | 5/2005 | Soejima .................... | 455/575.3 |
| 2010/0041439 A1 * | 2/2010 | Bullister ..................... | 455/566 |

* cited by examiner

*Primary Examiner*—Matthew D Anderson
*Assistant Examiner*—Bobbak Safaipour
(74) *Attorney, Agent, or Firm*—Steven M. Reiss (57) ABSTRACT

A portable electronic device has various functions such as mobile communication, multimedia entertainment, and data processing. The device includes a main body installed with two keyboards and two slide rails, and two sub-bodies respectively equipped with a display. The sub-bodies are pivoted to each other and rotate through a shaft, and slide along slide rails through connecting members on the main body respectively. Therefore, the sub-bodies can be lifted relative to the main body through the shaft and the connecting members, so as to be optionally drawn close to the main body with the two displays facing the same direction, or to stand on the main body with the two displays facing opposite directions. Therefore, two different operating modes are achieved.

10 Claims, 7 Drawing Sheets

PORTABLE ELECTRONIC DEVICE

CROSS-REFERENCE TO RELATED APPLICATIONS

This non-provisional application claims priority under 35 U.S.C. §119(a) on Patent Application No(s). 096221649 filed in Taiwan, R.O.C. on Dec. 19, 2007, the entire contents of which are hereby incorporated by reference.

BACKGROUND OF THE INVENTION

1. Field of Invention

The present invention relates to a portable electronic device, and more particularly to a portable electronic device having more than one display and keyboard.

2. Related Art

Mobile phone is an indispensable communication tool in the modern life, and is a kind of portable electronic devices, mainly for carrying out mobile audio or video communication. The main body of a conventional mobile phone is only provided with a single display and a single set of keyboard. The keyboard has a phone keypad consisting of Arabic numerals 0-9 and special keys such as *, #, ON, CUT, to be dialed by the user, such that the user is able to carry out any particular function of the mobile phone.

Recently, due to rapid development of communication technology and demanded by the market, multimedia entertainment (such as games, images, movies, music, and digital TV programs) is integrated into a mobile phone. Required by the multimedia application, mobile phone manufacturers seize the opportunity to put forward mobile phones with multimedia functions, and such mobile phones are generally referred to as smart phones. Some smart phones even provide functions of a personal digital assistant (PDA). Thus, a mobile phone is no longer merely a communication tool, but an important tool for processing and entertaining.

To cater for those accustomed to playing games on mobile phones to kill time, many game manufacturers put forward game software to be executed on smart phones. The game software can be generally divided into two types: 1P and 2P, and needs to be controlled by the keyboard of a mobile phone. Generally, a smart phone only needs a display and a keyboard to facilitate a user to perform game software, like shooting, car racing, and sports. However, for 2P game software, such as 2P chess, wrestling, and 2P competitions, two users must control through the same keyboard in turn, so the phone is passed to and back between the users, which is not only inconvenient in operation but also inefficient. In another aspect, when the two users intend to watch digital TV programs on a mobile phone at the same time, two different channels cannot be shown on the only display for the users.

Some smart phones equipped with double keyboards or double displays have already appeared in the market. For such phones, a one or two-way shaft or slide rail is provided to enable the main body, keyboard, or display to relatively rotate or move, such that a user can operate the smart phone in various operating modes. However, those smart phones having various operating modes are always limited by the rotating angle of the shaft, and thus cannot provide two complete sets of displays and keyboards for two users to perform 2P games, nor provide two different TV channels for two users at the same time.

SUMMARY OF THE INVENTION

In view of the above, the present invention is mainly directed to a portable electronic device, so as to solve the problems in the prior art that the smart phone fails to provide two users with 2P multimedia entertainment.

Accordingly, the present invention provides a portable electronic device having various functions such as mobile communication, multimedia entertainment, and data processing. The portable electronic device of the present invention includes a main body and two sub-bodies. The main body has a first keyboard, a second keyboard operated in a direction opposite to that of the first keyboard, and two slide rails. The slide rails are respectively disposed along the first keyboard and the second keyboard. The two sub-bodies are pivoted to each other through a shaft, and each have a display and a connecting member. Each connecting member is pivoted to an end edge of the corresponding sub-body, and slides along the slide rail on the main body. The sub-bodies rotate and shift relative to the main body through the shaft and the connecting members, so as to be optionally drawn close to the main body with the two displays facing the same direction, or to stand on the main body with the two displays facing opposite directions.

The efficacy of the present invention is that, the main body has a first keyboard and a second keyboard operated in opposite directions. The displays of the sub-bodies rotate and move relative to the main body through the shaft and the connecting members, so as to stand on the main body and corresponding to the operating directions of the first keyboard and the second keyboard respectively. Therefore, two sets of keyboards and displays are provided to be operated by two users, such that it is more convenient for the users to play 2P games or watch digital TV programs.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The objectives, structures, features, and functions of the present invention will be illustrated in detail below in the accompanying embodiments.

Figure 1:
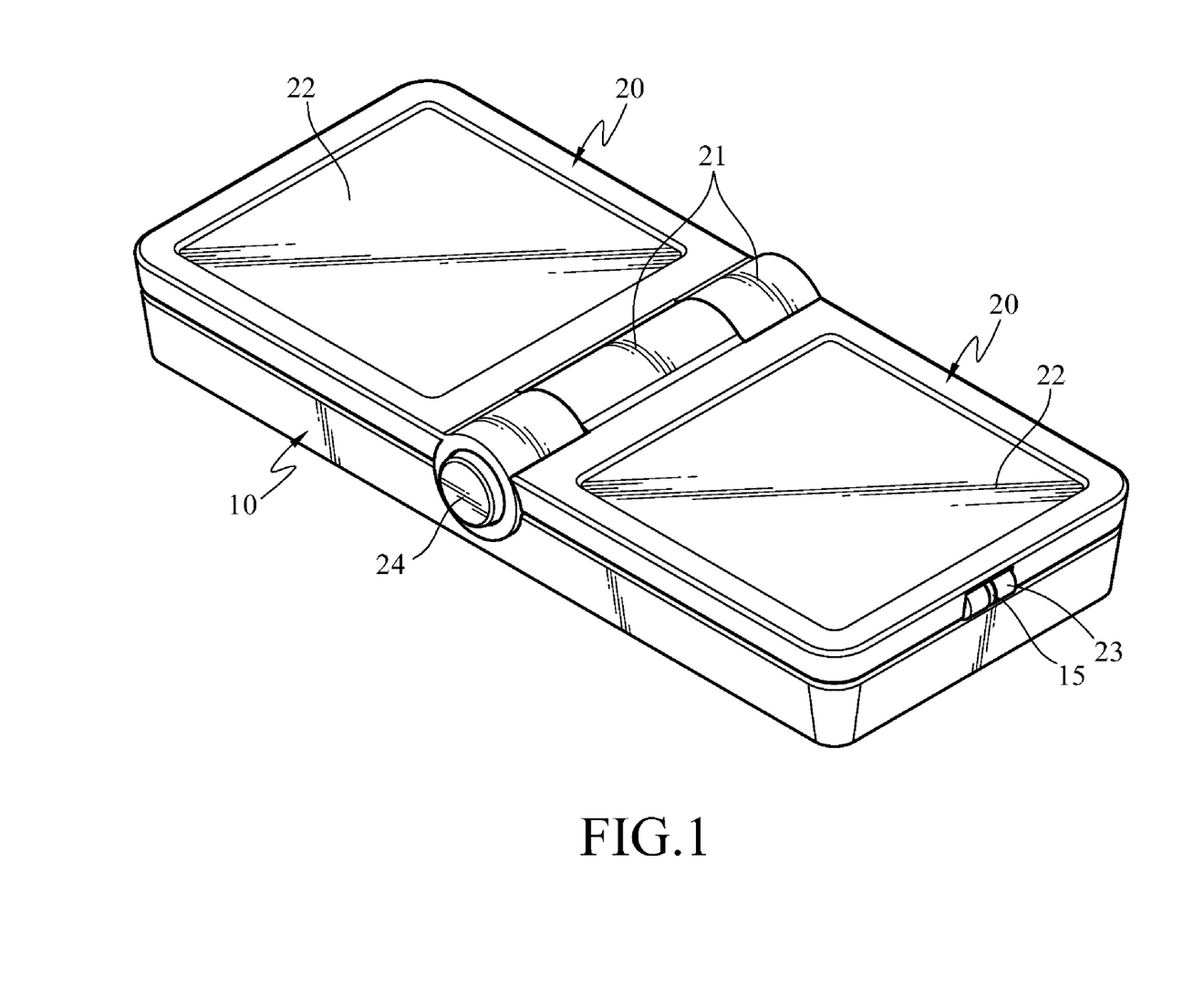
FIG. 1 is a schematic three-dimensional view of a portable electronic device according to the present invention with the sub-bodies being drawn close to the main body.

Referring to FIG. 1, a portable electronic device is provided, which has various functions such as mobile communication, multimedia entertainment, and data processing. The portable electronic device includes a main body 10 and two sub-bodies 20. In an embodiment of the present invention, the portable electronic device is actually a smart phone, or any other portable electronic device like personal digital assistant (PDA), handheld computer, or handheld game console.

Figure 2:
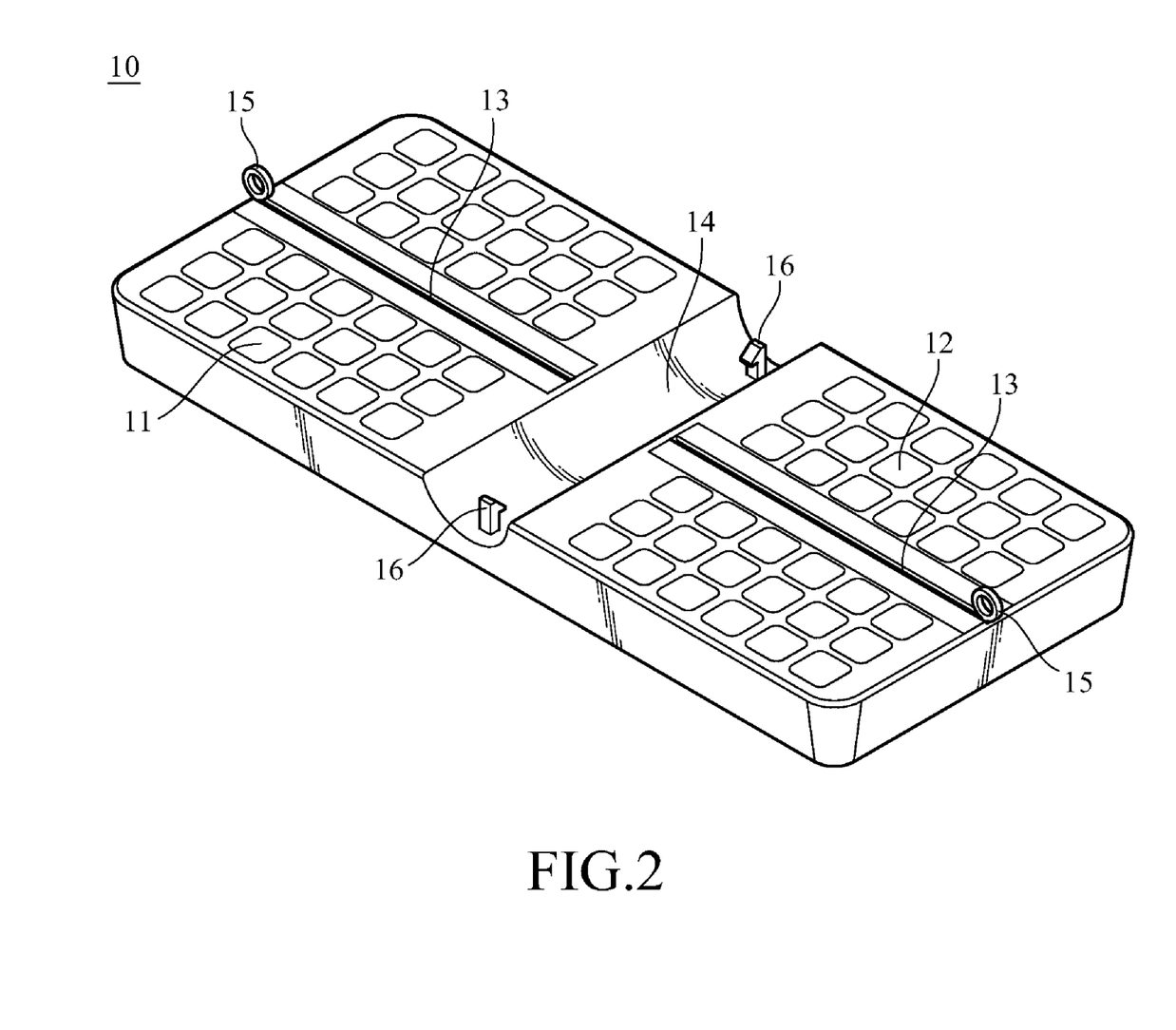
FIG. 2 is a schematic three-dimensional view of a main body according to the present invention.
Figure 4:
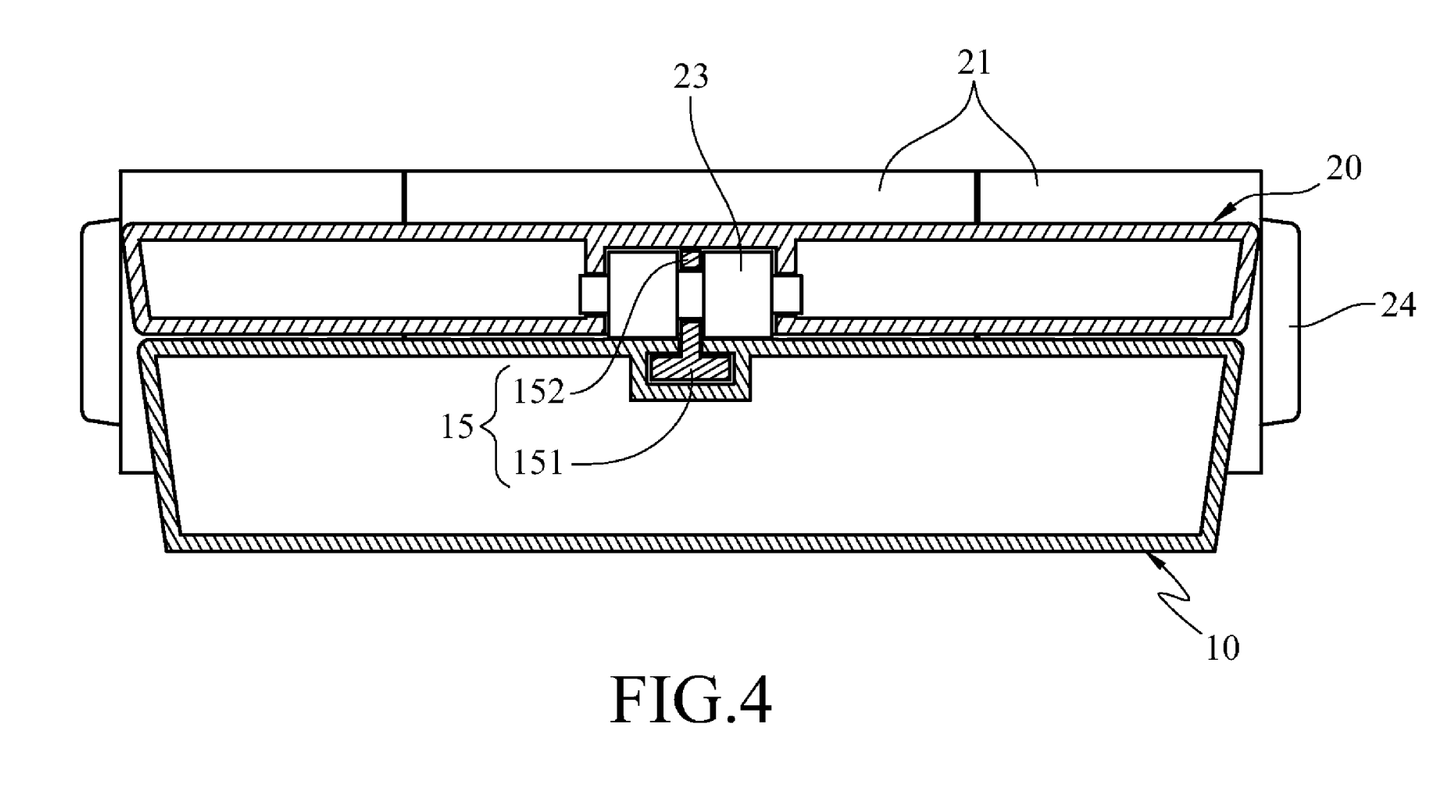
FIG. 4 is a schematic cross-sectional view of the main body and sub-bodies according to the present invention.

Referring to FIGS. 1, 2, and 4, the main body 10 has a first keyboard 11, a second keyboard 12, two slide rails 13, an arc groove 14, and two hooks 16. The main body 10 is rectangular, with opposite long sides and short sides and opposite wide surfaces and narrow surfaces. The first keyboard 11 and the second keyboard 12 are thin touch keyboards, for providing standard keys to be operated by a user, and each have a plurality of keys. The first keyboard 11 and the second keyboard 12 are disposed on a wide surface of the main body 10 facing the sub-bodies 20 respectively, and the first keyboard 11 is operated in a direction opposite to that of the second keyboard 12. The slide rails 13 are disposed along the long sides of the main body 10, and are respectively in the center of the first keyboard 11 and the second keyboard 12 on the wide surface of the main body 10 facing the sub-bodies 20. The arc groove 14 is disposed in the center of the main body 10, and between the first keyboard 11 and the second keyboard 12. The hooks 16 are respectively disposed at two ends of the arc groove 14, and facing the sub-bodies 20. Though the present invention takes two hooks 16 as a specific implementation aspect, the number of the hook 16 is not limited to two, and may also be one.

Referring to FIGS. 1, 3, 4, and 5A, the sub-bodies 20 are pivoted to each other through a shaft 21, and each have a display 22, a connecting member 15, and a roller 23. The sub-bodies 20 on the outer side of the shaft 21 respectively have a button 24 and an elastic member 25. The displays 22 may be touch displays, and respectively controlled by a software to provide a touch keyboard thereon for the user. Each display 22 is provided with a gravity sensor, for adjusting image display directions according to the operating status of the sub-body 20. The shaft 21 is disposed along the short side of the main body 10, and the two ends of the shaft 21 respectively have a limiting slot 211 and a notch 212 externally communicated with the limiting slot 211. The number of the button 24, the elastic member 25, the limiting slot 211, and the notch 212 is in accordance with that of the hook 16. Each connecting member 15 has a sliding block 151 and a collar 152. The sliding block 151 of each connecting member 15 is placed in the slide rail 13 to slide therein, such that the connecting member 15 is able to slide along the slide rail 13 on the main body 10. Each roller 23 is rotatablely disposed on an end edge of the shaft 21 far away from the sub-body 20, such that the roller 23 is able to roll along the first keyboard 11 or the second keyboard 12 on the main body 10. The collar 152 of each connecting member 15 is rotatablely fitted on the roller 23, so as to be pivoted to an end edge of the corresponding sub-body 20, such that the sub-body 20 is able to shift relative to the main body 10.

Figure 3:
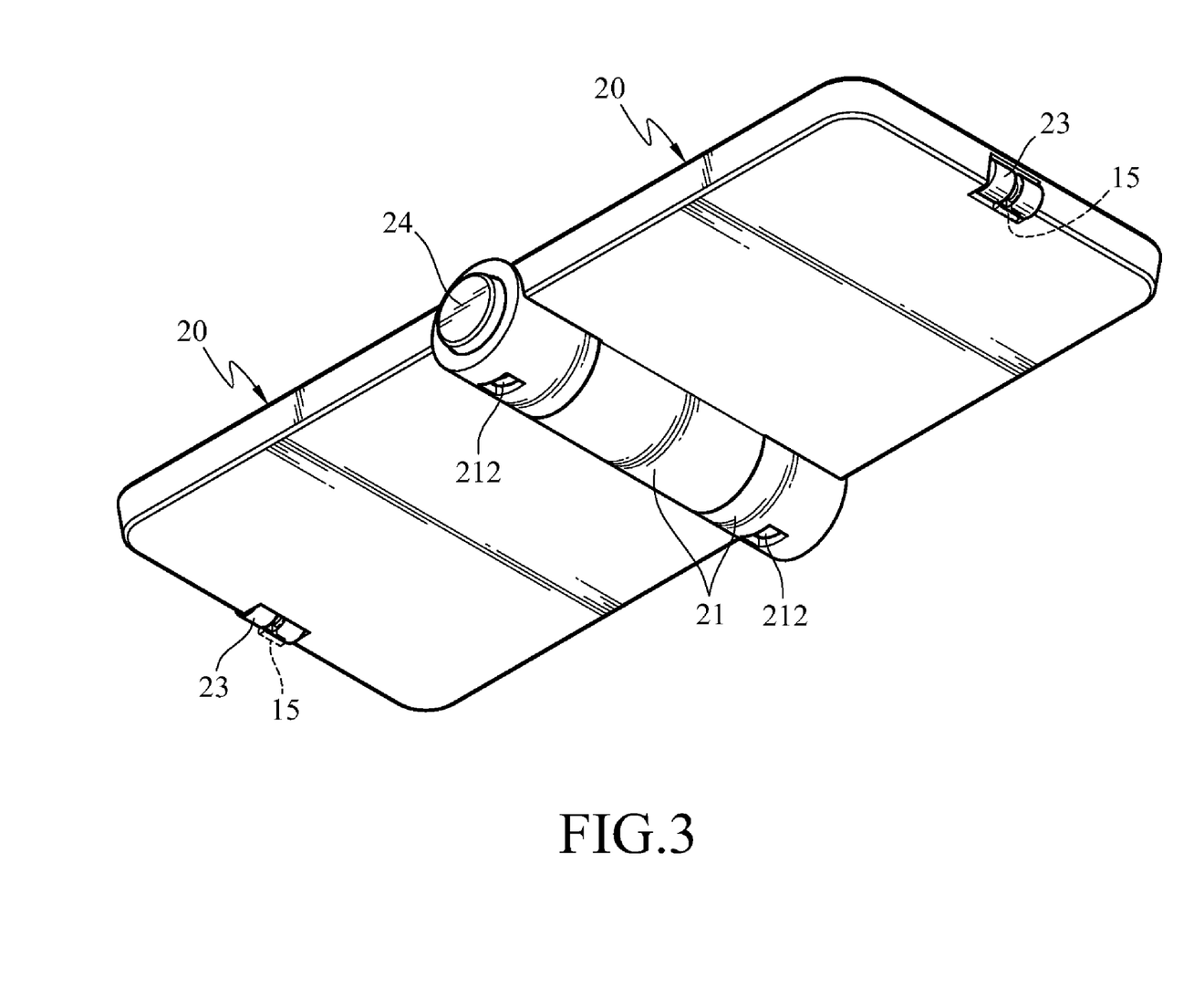
FIG. 3 is a schematic three-dimensional view of sub-bodies according to the present invention.
Figure 5A:
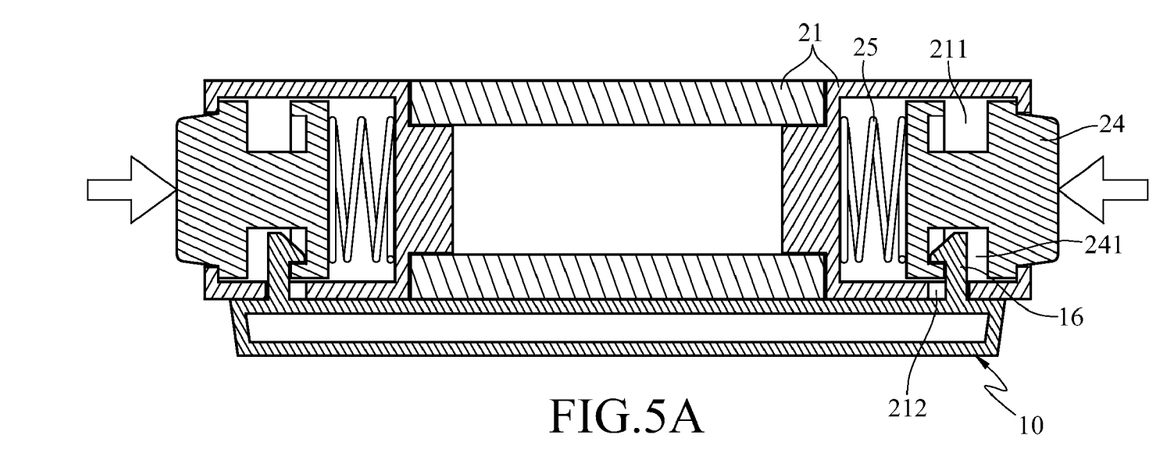
FIG. 5A is a schematic three-dimensional view showing sub-bodies at a shaft according to the present invention with the buttons being respectively at a catch position.
Figure 5B:
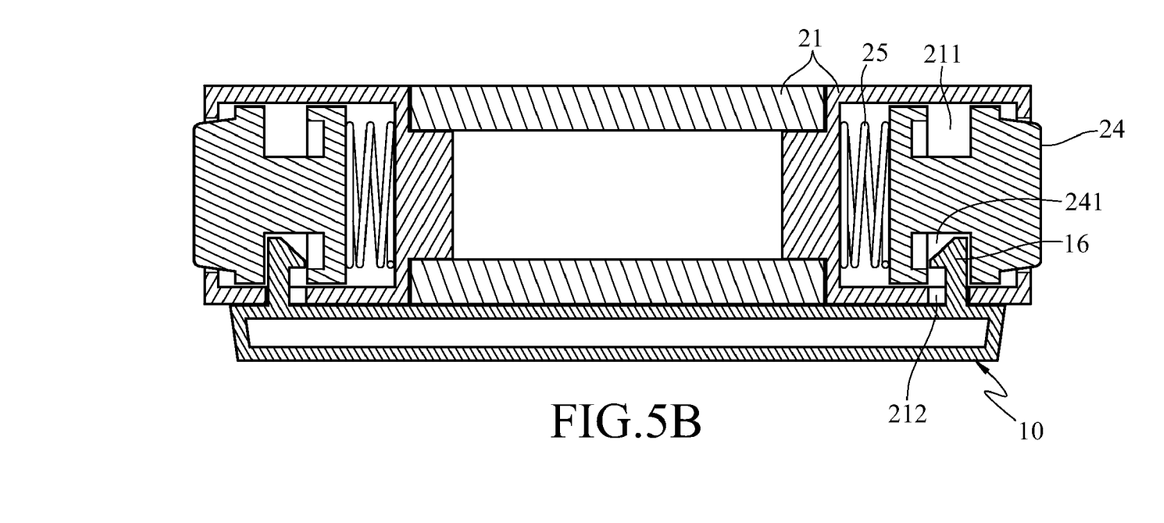
FIG. 5B is a schematic three-dimensional view showing sub-bodies at a shaft according to the present invention with the buttons leaving the catch positions.
Figure 6:
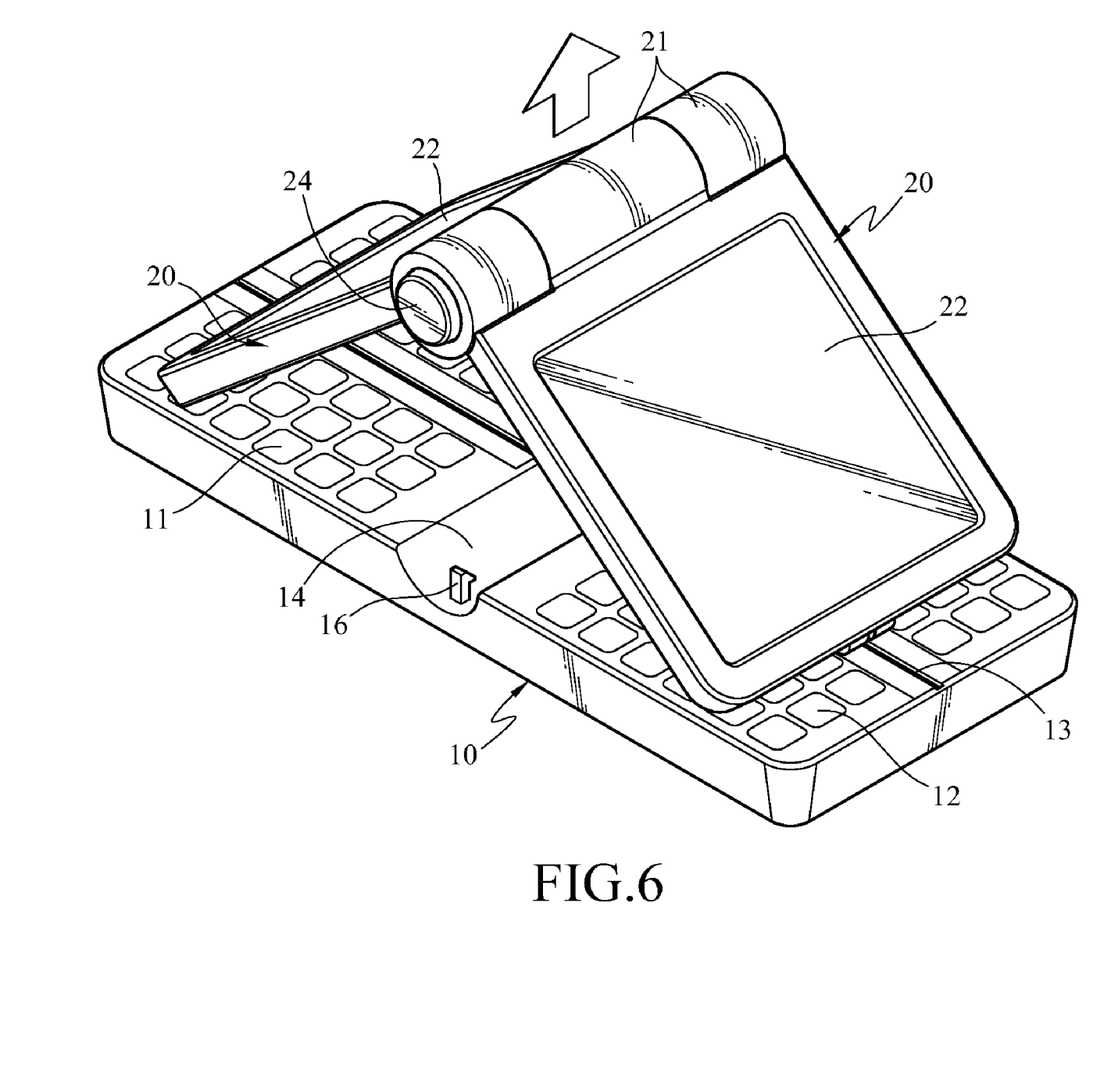
FIG. 6 is a schematic three-dimensional view of a portable electronic device according to the present invention with the sub-bodies rotating and moving relative to the main body.
Figure 7:
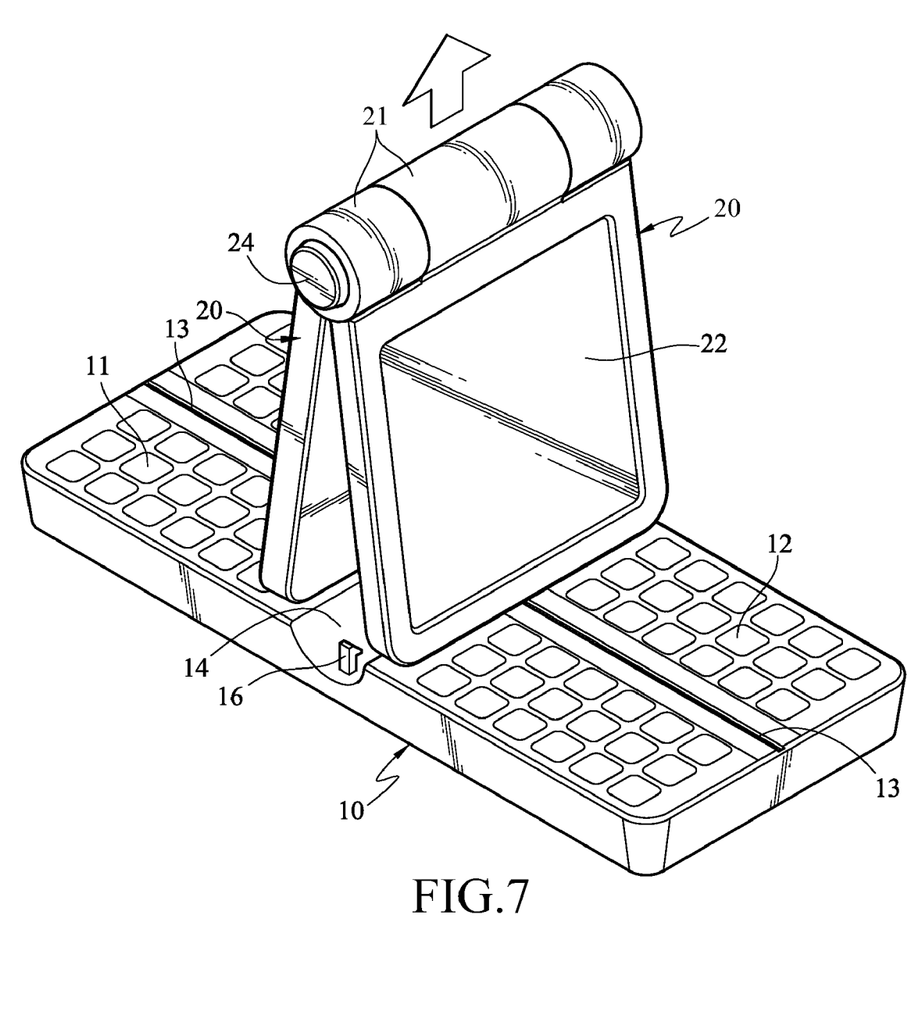
FIG. 7 is a schematic three-dimensional view of a portable electronic device according to the present invention with the sub-bodies standing on the main body.

Referring to FIGS. 3, 5A, and 5B, the buttons 24 are slidably disposed in the limiting slots 211 at the two ends of the shaft 21 respectively, and have front ends protruding from the two ends of the shaft 21, so as to be pressed by the user. Each button 24 has a buckling hole 241 opened corresponding to the notches 212 of the shaft 21. An edge of the buckling hole 241 of each button 24 retains the hook 16 at a catch position (FIG. 5A), so as to fix the corresponding sub-body 20 to the main body 10. The elastic members 25 are, but not limited to, compression springs, and are disposed corresponding to the buttons 24. The two ends of each elastic member 25 respectively abut against a bottom end of the corresponding limiting slot 211 and a rear end of the corresponding button 24, so as to normally push the button 24 to move toward the catch position. When the button 24 reaches the catch position, the hook 16 is retained by the edge of the buckling hole 241 and thus cannot drop out the button 24 and the shaft 21. When the button 24 is pushed toward the inside of the limiting slot 211, the button 24 will move inward and compress the elastic member 25 (FIG. 5B), such that the elastic member 25 acquires an elastic force to push the button 24 outward. In the present invention, the hooks 16 may also be disposed on the buttons 24 of the sub-bodies 20 respectively, and the buckling holes 241 are disposed in the arc groove 14 of the main body 10. Thereby, the hooks 16 on the sub-bodies 20 may be retained by the buckling holes 241 in the main body 10, so as to fix the sub-bodies 20 to the main body 10. Referring to FIGS. 1, 5A, 5B, 6, and 7, each sub-body 20 may be drawn close to (attached to) the main body 10 (FIG. 1). At this time, each hook 16 of the main body 10 extends through the corresponding notch 212 into the shaft 21, and is retained by the button 24 at the catch position (FIG. 5A), so as to fix the sub-body 20 to the main body 10. When the sub-bodies 20 are drawn close to the main body 10, the displays 22 face the same direction, in which one display 22 functions as a touch keyboard, and the other shows the operating status, such that a use is able to carry out mobile communication, enjoy multimedia entertainment, or process data. When the buttons 24 are pressed to leave the catch positions and release the hooks 16 (FIG. 5B), the user can lift the sub-bodies 20 through the shaft 21, such that the sub-bodies 20 rotates and shifts relative to the main body 10 through the shaft 21 and the connecting members 15 (FIG. 6), so as to stand on the main body 10 (FIG. 7). When the sub-bodies 20 stand on the main body 10, the displays 22 face opposite directions, and the first keyboard 11 and the second keyboard 12 of the main body 10 are exposed to be operated thereon. At this time, the first keyboard 11 and the second keyboard 12 may serve as standard keyboards, and the two displays 22 respectively show the operating status of each sub-body. Thereby, two users can enjoy multimedia entertainment or process data at the same time.

In the present invention, the main body 10 has a first keyboard 11 and a second keyboard 12 operated in opposite directions. The displays 22 of the sub-bodies 20 rotate and shift relative to the main body 10 through the shaft 21 and the connecting members 15, so as to stand on the main body 10 and corresponding to the operating directions of the first keyboard 11 and the second keyboard 12 respectively. Therefore, two sets of keyboards and displays are provided to be operated by two users, such that it is more convenient for the users to play 2P games or watch digital TV programs.

What is claimed is:

1. A portable electronic device, comprising:
    a main body, having a first keyboard, a second keyboard operated in a direction opposite to that of the first keyboard, and two slide rails respectively disposed along the first keyboard and the second keyboard; and
    two sub-bodies, pivoted to each other through a shaft, and each having a display and a connecting member, wherein each connecting member is pivoted to an end edge of the corresponding sub-body and slides along the slide rail, the sub-bodies rotate and shift relative to the main body through the shaft and the connecting members, so as to be optionally drawn close to the main body with the two displays facing the same direction, or to stand on the main body with the two display facing opposite directions.

2. The portable electronic device as claimed in claim 1, wherein each connecting member has a sliding block placed in the corresponding slide rail to slide therein.

3. The portable electronic device as claimed in claim 1, wherein each sub-body has a roller at an end edge far away from the shaft, the roller is rotatablely disposed on the sub-body, and rolls on the main body, such that the sub-body shifts relative to the main body.

4. The portable electronic device as claimed in claim 3, wherein each connecting member has a collar rotatablely fitted on the roller.

5. The portable electronic device as claimed in claim 1, wherein the main body has at least one hook, each sub-body has at least one button slidably disposed on one side of the shaft, and each button has a buckling hole for retaining the hook at a catch position, so as to fix the sub-body to the main body.

6. The portable electronic device as claimed in claim 5, wherein each sub-body has at least one elastic member disposed corresponding to the button, and the elastic member normally pushes the button to move toward the catch position.

7. The portable electronic device as claimed in claim 1, wherein the displays are touch displays.

8. The portable electronic device as claimed in claim 1, wherein the main body is rectangular, and the slide rails are disposed along long sides of the main body.

9. The portable electronic device as claimed in claim 8, wherein the slide rails, the first keyboard, and the second keyboard are disposed on a wide surface of the main body.

10. The portable electronic device as claimed in claim 8, wherein the shaft is disposed along short sides of the main body.

* * * * *